3,212,883
COPPER REFINING PROCESS
Robert E. Cech, Madison, Wis., and Charles M. McFarland, Schenectady, N.Y., assignors to General Electric Company, a corporation of New York
No Drawing. Filed Jan. 2, 1963, Ser. No. 248,880
8 Claims. (Cl. 75—72)

This invention relates to the metallurgy of copper and more particularly to a new process of simultaneously reducing and purifying copper oxide to obtain copper metal of at least electrical grade, the purifying process being carried out at temperatures below the melting point of copper.

The reduction of copper oxide by coke or charcoal (carbon) in an air blast furnace or bonfire was one of the first techniques developed by man for the production of metallic copper. Carbon reduction processes, although yielding a very impure product, were widely used until the eighteenth century when their use began to gradually decline and ultimately occurred only in rare circumstances. Within recent years, two processes have been outlined which involve the reduction of oxide copper through reactions including carbon. In one process, coke and limestone are mixed with a cuprous chloride ore concentrate and reacted in a rotary furnace. This reduction, however, is ineffective as a purification process and the reduced copper must be fire refined to a purity adequate for electrical use, since electrical copper should not contain more than about 0.05 weight percent impurity content. A more complete discussion of the process referred to above may be found in Journal of Metals, July 1961, 467, American Institute of Mining and Metallurgical Engineers, under the title "New Copper Process."

A second recent process utilizing carbon reduction is one described in U.S. Bureau of Mines Report No. 5501 by C. Rampacek, W. A. McKinney and P. T. Waddleton and entitled "Treating Oxidized and Mixed Oxide—Sulfide Copper Ores by the Segregation Process." This is a process for treating raw oxide, carbonate and silicate ores to render them amenable to beneficiation by leaching or flotation. The ore is ground to about 10 mesh and mixed with a small quantity of coke and common salt. The mixture is passed through an externally fired rotary kiln with a neutral or reducing atmosphere maintained in the heating and cooling zones. During the heat treatment, the copper values are extracted from the ore and segregated on the coke particles as copper metal. The copper may be recovered by flotation procedures or by leaching, although the copper powder produced is sub-micron in size and the attainment of a practical way to separate the copper from the salts and composites may not be possible. The copper metal recovered by this "segregation" process will effect some limited purification but it is insufficient to render it of value as a purification process for copper.

It is a principal object of this invention to provide a new and novel process for purifying copper which utilizes carbon as the reducing agent.

Another object of this invention is to provide a carbon reduction process for purifying copper in which the copper is obtained in a more pure and coarser, crystalline form than has previously been possible.

Other objects and advantages of this invention will be in part obvious and in part explained by reference to the accompanying specification.

The present invention in its broadest aspects contemplates the reduction of either cuprous or cupric oxide at temperatures below the melting point of copper (1083° C.), by utilizing carbon as the reducing medium but also including a metal chloride and a copper chloride or complex copper chloride compound in the reaction mixture. The metal chloride may be any one of the alkali metal chlorides or alkaline earth metal chlorides but preferably will be either sodium chloride or potassium chloride. The copper chloride is preferably either cuprous chloride or copper oxychloride.

The copper chloride, this term being used here and at all subsequent places in the specification as including copper oxychloride or other related compounds which upon heating will provide copper chloride, is felt to be vital in enabling the present process to effect purification of the copper when it is reduced from the oxide to the metallic state. This material is also extremely important in obtaining a course crystalline copper particle structure rather than an extremely fine flake-like shape. It is believed, although it should be recognized that this process is not contingent upon this theory, that the copper chloride salt phase is necessary because it enables the fine particles which precipitate first to dissolve and reprecipitate on larger particles some distance away.

This process can utilize either cuprous or cupric oxide as its starting material, although cuprous oxide is preferred since more metallic copper is obtained per unit of raw material introduced into the starting reaction mixture. For example, compare the following reactions:

(1)   $2Cu_2O + CuCl + C + ACl^* \rightarrow$
$$4Cu + CO_2 + CuCl + ACl^*$$

(2)   $2CuO + CuCl + C + ACl^* \rightarrow$
$$2Cu + CO_2 + CuCl + ACl^*$$

\* Where ACl is an alkali metal chloride or an alkaline earth metal chloride.

The starting copper oxide can be obtained from any suitable source, that is from either ore or scrap copper metal. Scrap copper metal provides an excellent large source and metal from which cuprous oxide can be obtained by leaching procedures, such as that described in the copending application of Robert E. Cech, Serial No. 249,036, filed January 2, 1963, and assigned to the same assignee as this invention. Briefly, this leaching process is one wherein copper scrap is contacted with an aqueous solution of copper ammonium carbonate and ammonia, the constituents being present in the ionized forms:

(1)      $Cu(NH_3)_4^{++}$; $(4+\delta)(NH_3)$ aq.
(2)      $(HCO_3)^-$

These ion formulas represent idealized conditions and actually they are probably much more complex. The reaction between copper input and the leaching solution may be expressed as:

(3)    $Cu + Cu(NH_3)_4^{++} + 2(HCO_3)^-$
    $+ (4+\delta)(NH_3)$ aq. $\rightarrow Cu_2(NH_3)_4^{++}$
        $+ 2(HCO_3)^- + (4+\delta)(NH_3)$ aq.

δ=unknown excess quantity of dissolved ammonia.

To obtain the copper oxide precipitate, the product of Reaction 3 is heated as shown in the following Reaction 4:

(4)    $Cu_2(NH_3)_4^{++} \cdot 2(HCO_3)^- + (4+\delta)(NH_3)$ aq. $\rightarrow$
    $Cu_2O_{(ppt)} + (8+\delta)(NH_3)_{(gas)} + 2(CO_2)_{(gas)} + H_2O$ δ=unknown excess quantity of dissolved ammonia.

It will be recognized that in all probability some cupric oxide is obtained as well as cuprous oxide since undoubtedly some cupric amine ions are present in the solution that is being heated. A more complete and detailed description of the operating parameters of this leaching process can be obtained in the copending application referred to.

As was previously mentioned, the copper chloride can either be present as the cuprous chloride CuCl or as a copper oxychloride which is probably in one of the two forms:

(a) $CuCl_2 \cdot 2CuO \cdot 4H_2O$
(b) $CuCl_2 \cdot 3CuO \cdot 3H_2O$

It will be recognized that these latter two compounds are of the type which will dissociate and provide a source of copper chloride to the reaction mixture. Thus, applicants' invention is not limited to these specific compounds but contemplates all compounds which are dissociable to form copper chloride and which do not include other materials which will unduly contaminate the reaction mixture upon dissociation. Considering some specific examples of the present process, a mixture was prepared in which petroleum coke, sodium chloride, cuprous chloride, and cuprous oxide were mixed in the molar proportions:

$$C + NaCl + CuCl + 2Cu_2O$$

The mixture was placed within a high temperature glass ampule and heat treated for 60 minutes at 700° C., then cooled, crushed and washed to separate the copper powder from the salts. The powder resulting from this treatment was coarse and equiaxed, resembling copper powder produced by the reduction process described in the aforementioned, copending Cech application. This finding demonstrates that the addition of copper chloride to a coke-salt-copper oxide mixture produces an extremely important alteration in the physical characteristics of the reaction product which greatly lessens the technical difficulties of bringing about a physical separation of copper powder and salts. At this point it might be mentioned that the temperature range for effecting this process is from about 600 to 775° C., the preferred range extending from about 700 to 775° C. depending upon the particular ingredients used. Temperatures outside of these ranges are either too low to cause the reaction to proceed at a realistic rate or so high as to result in melting and/or volatilization of some of the ingredients.

The ability of the new carbon-copper chloride reduction process to purify copper oxide was tested by using as starting material a concentrate produced from ammonium carbonate leaching of scrap automobile radiators. The metal content of this material was 79.37 weight percent copper, 18.37 weight percent zinc and 2.26 weight percent lead. A mixture was prepared using this concentrate together with petroleum coke and sodium chloride plus copper chloride in the molar proportions:

$$C + 2CuO + NaCl + CuCl$$

In this reaction only the carbon and copper oxide reacted chemically while the sodium and copper chlorides act as dispersing agents and flux for permitting recrystallization of reduced copper.

The prepared mixture was reacted 60 minutes at 700° C., then cooled, crushed and washed to remove impurities and water soluble salts. The reduced copper powder was chemically analyzed for zinc and spectrographically analyzed for lead, tin, iron, nickel, and cobalt. Table I below shows the weight percent of the impurities detected.

Table I

| | |
|---|---|
| $Zn = 0.06\%$ | $Ni = 0.05\%$ |
| $Pb < 0.01\%$ | $Co < 0.01\%$ * |
| $Fe = 0.001\%$ | $Sn < 0.01\%$ * |

*Not detected.

These results show that a copper powder nearly good enough for electrical use is produced by carbon-copper chloride reduction of a concentrate containing more than 20 percent total metallic impurities. If the input material had been treated to reduce the impurity level to a few percent before reduction, the purity of the reduced copper would have been correspondingly improved.

In preparing the initial mixture of reactants, it is obvious that the maximum results are obtained where approximately the stoichiometric proportions previously set forth in Reactions 1 and 2 should be adhered to. However, if stoichiometry is deviated from, then it should be only in the direction providing for minor excess amounts of chloride or a slight excess of copper oxide. Generally, the provision of a slight excess amount of the alkali metal chloride or the alkaline earth metal chloride will slighty depress the reaction kinetics but drive it further toward completion. On the other hand, a slight excess of copper oxide or of copper chloride tends to increase the overall reduction rate but does not alter the final equilibrium to a significant extent. Thus, the stoichiometric proportions may be expressed as 1 mole part carbon to 2 to 2.5 total chloride content to 2 to 2.5 copper oxide content.

The experiments outlined here show that copper oxide is reduced and purified by finely divided carbon acting in the presence of copper chloride and an alkali metal chloride or alkaline earth metal chloride. Carbon reduction in the presence of salt (chloride) but without copper chloride produces a finely divided copper which has a higher impurity level than similar specimens reduced in the presence of copper chloride.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What we claim as new and desire to secure by Letters Patent of the United States is:

1. A method for reducing copper oxide to metallic copper comprising, preparing a reaction mixture having as active constituents carbon, copper oxide, a chloride selected from the group consisting of copper chloride and copper oxychloride, and a metal chloride selected from the group consisting of alkali metal chlorides and alkaline earth metal chlorides, and heating the reaction mixture at an elevated temperature for a time sufficient to react the active constituents and reduce the copper oxide to metallic copper.

2. A method for reducing copper oxide to metallic copper comprising, preparing a reaction mixture having as active constituents carbon, copper oxide, a chloride selected from the group consisting of copper chloride and copper oxychloride, and sodium chloride, and heating the reaction mixture to an elevated temperature for a time sufficient to react the active constituents and reduce the copper oxide to metallic copper.

3. A method for reducing copper oxide to metallic copper comprising, preparing a reaction mixture having as active constituents carbon, copper oxide, a chloride selected from the group consisting of copper chloride and copper oxychloride, and potassium chloride, and heating the reaction mixture to an elevated temperature for a time sufficient to react the active constituents and reduce the copper oxide to metallic copper.

4. A method for reducing copper oxide to metallic copper comprising, preparing a reaction mixture having as active constituents carbon, copper oxide, a chloride selected from the group consisting of copper chloride and copper oxychloride, and a metal chloride selected from the group consisting of alkali metal chlorides and alkaline earth metal chlorides, heating the reaction mixture to a temperature of from about 600 to 750° C. for a time sufficient to react the active constituents and reduce the copper oxide to metallic copper.

5. A process as defined in claim 2 wherein said reaction mixture is heated to a temperature of from about 600 to 775° C.

6. A process as defined in claim 3 wherein said reaction mixture is heated to a temperature of from about 600 to 775° C.

7. A process as defined in claim 2 wherein said chloride is cuprous chloride and said reaction mixture is heated from about 600 to 775° C.

8. A process as defined in claim 3 wherein said chloride is cuprous chloride and said reaction mixture is heated from about 600 to 775° C.

References Cited by the Examiner

UNITED STATES PATENTS

| 919,130 | 4/09 | Collins | 75—72 |
| 1,275,374 | 8/18 | Bradley | 75—72 |
| 1,679,337 | 7/28 | Moulden et al. | 75—72 |
| 2,754,193 | 7/56 | Graham et al. | 75—72 |

BENJAMIN HENKIN, *Primary Examiner.*

DAVID L. RECK, *Examiner.*